Dec. 10, 1929.  R. LEPSOE  1,738,910
PRODUCTION OF ZINC
Filed June 24, 1927  2 Sheets-Sheet 1
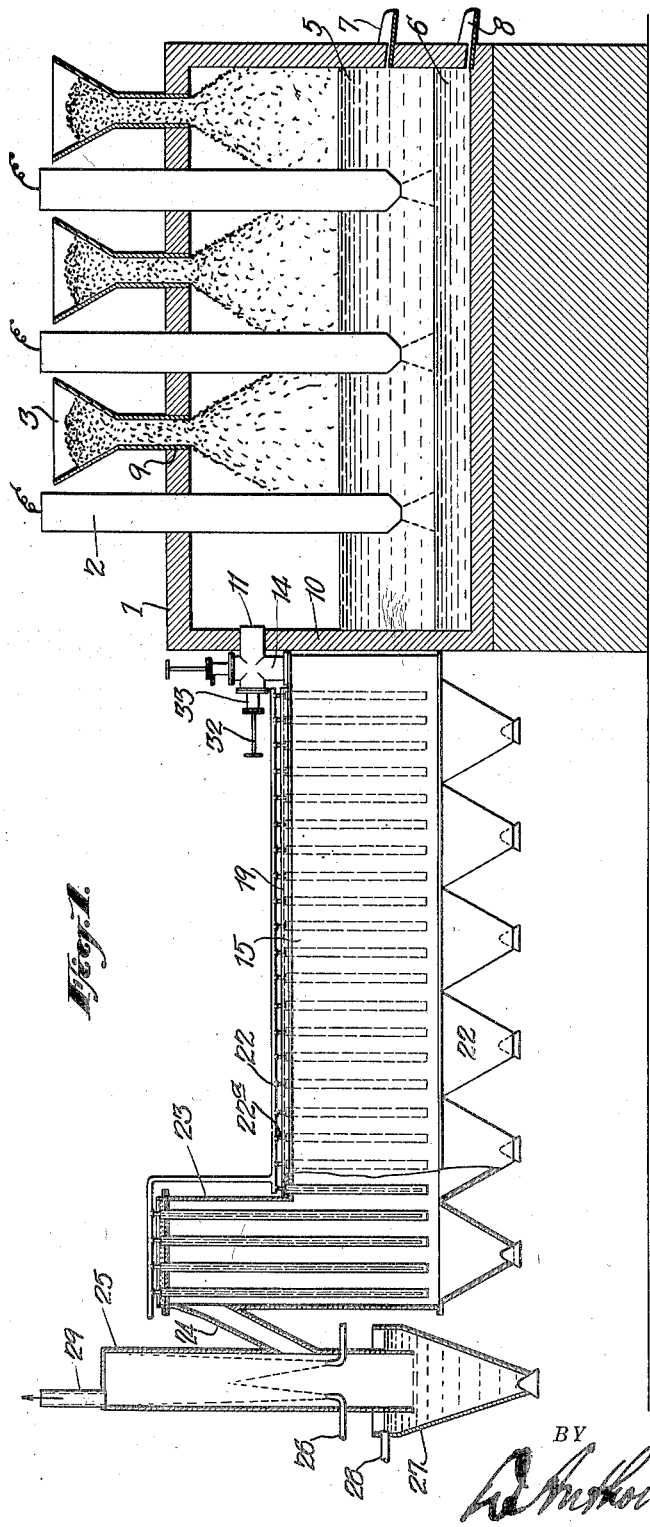
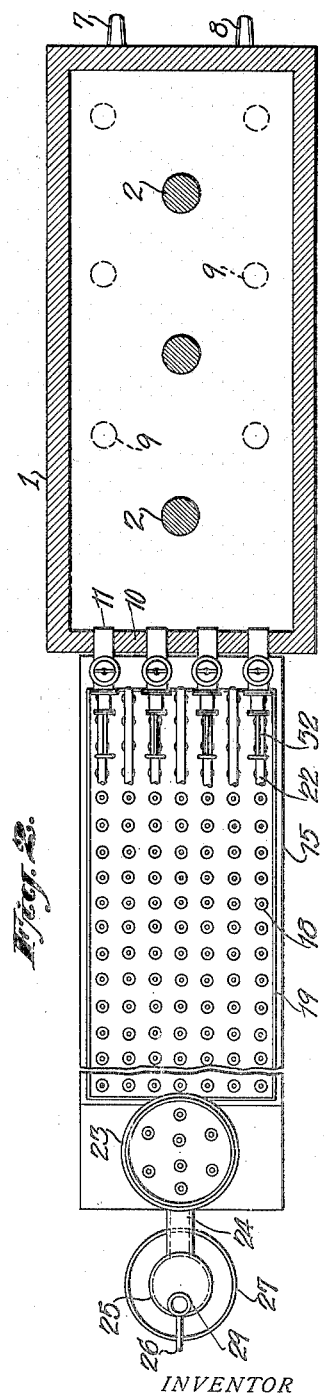
INVENTOR
ROBERT LEPSOE.
BY
ATTORNEY Dec. 10, 1929.    R. LEPSOE    1,738,910
PRODUCTION OF ZINC
Filed June 24, 1927    2 Sheets-Sheet 2
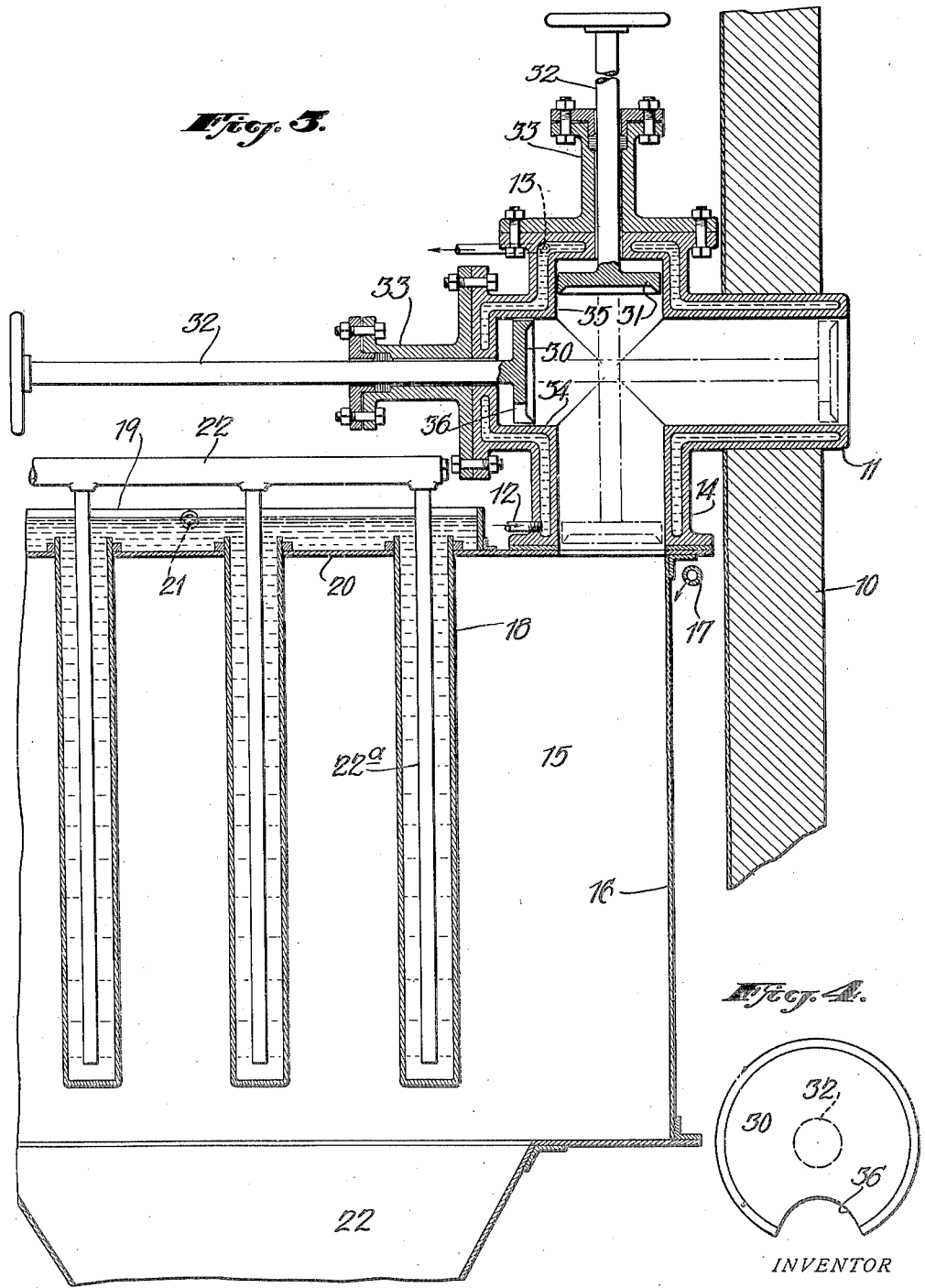
INVENTOR
ROBERT LEPSOE.
BY
[signature] ATTORNEY Patented Dec. 10, 1929

1,738,910

UNITED STATES PATENT OFFICE

ROBERT LEPSOE, OF TRAIL, BRITISH COLUMBIA, CANADA

PRODUCTION OF ZINC

Application filed June 24, 1927. Serial No. 201,112.

The invention aims to provide an apparatus for the economical recovery of the zinc from blast furnace slags and other materials such as ores, residues and dross containing zinc.

The accompanying drawings illustrate apparatus for carrying out the process.

Fig. 1 is a vertical section (partly in elevation) more or less diagrammatic of the complete apparatus;

Fig. 2 is partial plan and partial section of the same;

Fig. 3 is a longitudinal section enlarged of a part of the apparatus;

Fig. 4 is an end view of a piston.

A three-phase electric furnace is indicated at 1 with electrodes 2 passing down through the roof. A charge of slag or similar material is introduced through the roof by means of hoppers 3. The charge consists of the zinciferous material, such, for example, as lead blast furnace slag or zinc plant residues, mixed with a quantity of coke or other carbon which will reduce the oxides to zinc which will be vaporized and pass off with a certain amount of carbon monoxide gas. I have treated, for example, a lead blast furnace slag containing 11.5 per cent Zn, 0.7 per cent Pb, 38 per cent FeO, 22 per cent $SiO_2$, 14 per cent CaO and 2.8 per cent S. This slag is mixed with 10 per cent of coke and charged continuously. The charge is melted and separated by gravity into two layers 5 and 6.

The first is a slag containing 50 per cent $SiO_2$, 30 per cent CaO, 3 to 4 per cent FeO and 0.5 to 1.5 per cent Zn, and is drawn off from time to time through a tap hole and spout 7. The bottom layer is an iron product containing 90 per cent iron and some silicon and sulphur, and is drawn off through a similar tap hole and spout 8. The gas is a mixture containing zinc, lead, carbon monoxide, and some carbon dioxide. The temperature of the furnace is about 1400 degrees C. in the slag and iron products and 1100 degrees to 1200 degrees in the gas mixture. The furnace is preferably rectangular in shape with the electrodes in line and the charge admitted in such a way as to leave a part of the surface of the bath exposed for escape of the gas, the positions of the charge holes being indicated at 9 in Fig. 2.

Extending through an end wall 10 of the furnace are pipes or tuyères 11 for the passage of the gas mixture. They are so located that the temperature of the gas entering them is sufficiently above the dew point of zinc, lead and any other substance present in the gas, say, a temperature of at least 1100 degrees C. At such a temperature also the amount of carbon dioxide and its oxidizing effect on zinc vapor are at a minimum.

The tuyères 11 are water cooled. They are double-walled as shown in Fig. 3 with a water inlet 12 near the bottom and outlet 13 near the top. Each tuyère has a vertical branch 14 leading down to a settling vessel or flue 15. In passing through the water cooled pipes, the gas is quickly chilled. For example, the temperature may be lowered from 1100 degrees to 300 degrees C. The metallic vapor, consisting mainly of zinc and lead, is thus condensed to a fine, almost impalpable, powder, which is suspended in the carbon monoxide gas and, by the high velocity of the latter, is carried over to the settling flue or chamber 15.

This chamber is further cooled. The end wall 16 nearest to the furnace is cooled by a water spray directed against it from a pipe 17, and the other walls may be similarly cooled. Within the chamber are numerous vertical pipes 18 closed at the bottom and open at their upper ends to a trough 19 upon the roof 20 of the chamber, which trough has a water outlet 21. Above the trough are longitudinal water pipes 22 with branches $22^a$ extending down into the pipes 18 and open at their lower ends. Water passes in through the pipes 22 and branches $22^a$ and out through the pipes 18 and trough 19. Thus the temperature of the gas is further cooled in the chamber 15. This tends to diminish its volume and velocity. The chamber 15 is so large as to further check the velocity of the gas. In this way there is obtained an efficient settling of the powder out of the gas. The chamber is made of sheet iron and may be so large that practically all the powder will settle therein and collect in the hoppers 22 at the bottom of the chamber, whence it is removed.

It is preferable, however, to recover a part of the suspended powder from the gas after it leaves the chamber 15. For this purpose the chamber is extended upward at its rear end in the form of a drum 23 from the top of which the gas passes through a pipe 24 to a tower 25 near the lower end of which are water nozzles 26 which fill the tower with spray. At the bottom is a hopper 27 in which the wet dust collects and from which it may be removed from time to time, the water overflowing through a pipe 28 and the clean gas escaping through a pipe 29 at the top of the tower. The gas, though cooled in the manner described, still retains considerable heat and may be subsequently used for heating purposes.

The water cooled pipes 11, 14 are of special construction. They are made of sheet iron welded together with a surrounding space of about an inch for an inside diameter of 8 to 20 inches. Or they may be made of hollow castings of iron or bronze. They are kept clean by means of plungers 30 and 31 fitting with a slight play in the longitudinal and cross tube, and having cutting edges on their forward faces. They are carried on rods 32 which extend through glands or stuffing boxes 33.

As shown in Fig. 4, each piston has a slot or opening 36 through one edge to prevent accumulation of powder behind it when it is re-drawn into its recess. In line with the pipe 11 and with the branch 14 there are recesses 34 and 35 to accommodate the plungers out of the path of the gas. These recesses are included in the water cooled structure, and this will generally keep the plungers cool enough, but the latter may also be independently water-cooled.

The pistons are reciprocated frequently through the entire passages as shown in dotted lines, in order to keep the surfaces clean and free from the accumulation of a crust which tends to form by condensation of zinc vapor and lead vapor. Such crusts are not formed to any great extent above 1100 degrees C. nor below 400 degrees C. They form most readily between 900 degrees and 600 degrees C. within which range zinc vapor or lead vapor is condensed to drops instead of to powder. The crust tends to build up also from other causes—the condensation of impurities such as zinc sulphide and lead sulphate, dust from the furnace carried over with the gas and fused, zinc oxide formed by the carbon dioxide present, carbon produced by decomposition of carbon monoxide. All these causes tend to build up a crust which almost amalgamates with any brick work and is difficult to cut even with steel.

By water cooling the entire passage I prevent such a gradual drop in temperature as would build up a serious crust. The water cooled pipes extend clear through the brick work of the furnace. The gas therefore strikes a cold iron surface and this accumulates only a soft fine powder which is easily removed by the pistons. They must be manipulated frequently to prevent such an accumulated thickness of powder as would, by its low heat conductivity, permit the formation of a crust on the inner surface.

It is also important to have the gas enter the pipes 11 at about 1100 degrees or higher. If the temperature fell much below this, say, to 900 degrees, the brick work adjacent to the pipes would accumulate a crust which would in time clog the pipes. The difficulty is particularly great in the case of very dilute zinc vapor, such as we get from lead blast furnace slags and zinc residues; but it is harmful also with rich zinc concentrates and even with zinc dross.

In the redistillation of zinc metal, where the gas consists chiefly or wholly of zinc, it is not important.

The quick chilling of the gas is valuable also in diminishing to a trifling amount the oxidizing effect of any carbon dioxide in the gas. For example, with 15 per cent carbon dioxide in the gas, I have found that in the resulting zinc powder 90 per cent of the total zinc was still metallic zinc. From lead blast furnace slag I have obtained a product which averages 86 per cent total zinc, 84 per cent metallic zinc, 6 per cent lead, 1 per cent sulphur, 0.8 per cent FeO, 2 to 3 per cent insoluble and 2 ounces of silver per ton.

The product is exceedingly fine and efficient as a precipitant. It has been used as a substitute for atomized zinc dust in the purification of zinc solution prior to electrolysis. It is also useful as a precipitant in the cyanidation of gold and silver.

I have referred to it as a zinc powder, but if there is lead in the furnace charge, the product will also contain some lead powder. It is in the form of exceedingly fine sphericles of metallic zinc plus some impurities. Any zinc oxide present is accidental and, in the samples which I have analyzed, amounts to only a few per cent. The actual composition will naturally vary to some extent with the raw material of the charge.

The operation may be carried out in connection with blast furnaces or other types of metallurgical furnace instead of the electrical furnace illustrated. The several passages, pipes and chambers described, may be varied in shape and dimensions.

Various other modifications may be made in the process and apparatus by those skilled in the art without departing from the invention as defined in the following claim.

What I claim is:

The combination of a furnace having means for introducing continuously a supply of zinciferous material and carbon and melting the charge to form a bath with an exposed surface and a zinc-containing gas at such a high temperature as to prevent the accumulating of a deposit on the wall within the furnace, a condenser for the gas closely adjacent to the furnace and a comparatively short tuyère extending through the wall of the furnace for the continuous passage of the gas from the surface of the bath as it is formed directly to the condenser, the tuyère being located so close to the bath that the gas enters it at the aforesaid high temperature, and means for cooling the tuyère throughout its length to cause a sudden and extreme drop in the temperature of the gas through the dew-point and down to the point of condensation of the metallic vapor to powder while passing through the tuyère so as to avoid the formation of a hard crust within the tuyère and means for removing any powder deposited in the tuyère so as to keep the cooling effect at a maximum without interrupting the continuity of the operation.

In witness whereof, I have hereunto signed my name.

ROBERT LEPSOE.